United States Patent
Atsumi et al.

(10) Patent No.: US 7,349,935 B2
(45) Date of Patent: Mar. 25, 2008

(54) RANDOM NUMBER GENERATION APPARATUS

(75) Inventors: Osamu Atsumi, Sagamihara (JP); Fumio Mita, Sagamihara (JP)

(73) Assignees: Sangikyo Corporation, Kanagawa (JP); Santekuto Corporation, Kanagawa (JP)

( * ) Notice: Subject to any disclaimer, the term of this patent is extended or adjusted under 35 U.S.C. 154(b) by 669 days.

(21) Appl. No.: 10/692,483

(22) Filed: Oct. 23, 2003

(65) Prior Publication Data

US 2004/0114761 A1 Jun. 17, 2004

Related U.S. Application Data

(63) Continuation of application No. PCT/JP02/03075, filed on Mar. 28, 2002.

(30) Foreign Application Priority Data

Apr. 24, 2001 (JP) .............................. 2001-163428

(51) Int. Cl.
*G06F 1/02* (2006.01)
(52) U.S. Cl. .................................................. 708/250
(58) Field of Classification Search ......... 708/250–256
See application file for complete search history.

(56) References Cited

U.S. PATENT DOCUMENTS 5,402,488 A * 3/1995 Karlock ..................... 360/60
5,436,973 A * 7/1995 Amoroso .................... 708/250
2001/0023423 A1* 9/2001 Marinet ..................... 708/250

FOREIGN PATENT DOCUMENTS

| JP | 66592 | 3/2000 |
| JP | 200066592 | 3/2000 |
| JP | 276329 | 10/2000 |
| JP | 276330 | 10/2000 |
| JP | 298577 | 10/2000 |
| JP | 2000276330 | 10/2000 |
| JP | 2000298577 | 10/2000 |

* cited by examiner

*Primary Examiner*—Chat C. Do
(74) *Attorney, Agent, or Firm*—Koppel, Patrick, Heybl & Dawson (57) ABSTRACT

In this invention, a random number generation apparatus inputs unperiodic random noise n generated by a noise source 1 to a waveform shaping circuit 2 to generate a random pulse wave P1. Next, the random number generation apparatus inputs the random pulse wave P1 and a clock c1 from an oscillator 3 to a sample-and-hold circuit 4 to generate a constant periodic binary pulse sequence P2. Subsequently, the binary pulse sequence P2 and a half divided clock c2, which is the clock c1 half divided by the divider 5, are inputted to a switching circuit 6, and the polarity of the binary pulse sequence P2 is reversed at intervals of one period to output a smoothed binary pulse sequence P3 in which appearance balance of 1/0 code is smoothed.

7 Claims, 7 Drawing Sheets

RANDOM NUMBER GENERATION APPARATUS

PRIORITY CLAIM

In accordance with 35 U.S.C. 120 and 35 U.S.C. 365(c), this application is a continuation of International Application PCT/JP02/03075, which has an international filing date of Mar. 28, 2002 and which claimed priority to Japanese patent application number 163428/2001, filed in Japan on Apr. 24, 2001.

FIELD OF THE INVENTION

This invention relates to a random number generation apparatus for generating random numbers to be used for ID passwords or various kinds of encryption keys for information security.

DESCRIPTION OF THE RELATED ART

To improve security of ID passwords and various kinds of encryption keys, it is necessary that an appearance probability of 1 or 0 (hereafter, called as "1/0") be equal to a probability of ½, and that proper random numbers, in which each bit is independent and there is no correlation between bits, be used.

A die or coin cannot actually be shaken to generate proper random numbers, and such numbers are often generated using physical random numbers, which are acquired by measuring voltage changes of electrical noise, or by other methods. However, proper random numbers cannot be acquired only by using physical random numbers as they are.

In the bit sequence of a physical random number, 1/0 appears as a non-rule, however, an appearance balance of 1/0 has indefiniteness, and therefore 1/0 is imbalanced.

Therefore, as a method of solving imbalance of physical random numbers, a noise level is controlled by performing feedback of an integration value of an output pulse sequence to a random number generation side; or a random number is generated by inputting an output pulse sequence to a shift register and then calculating the logical sum of the parallel-converted pulse sequence.

However, both of these methods involve elements governed by contingency, with the result that it is difficult to make with any certainty an appearance balance of 1/0 into equal probability.

It is therefore an object of this invention to provide a random number generation apparatus, which solves imbalance of physical random numbers, without being governed by contingency, and which can make an appearance balance of 1/0 into equal probability, with certainty.

SUMMARY OF THE INVENTION

To achieve the stated object, this invention is constituted as follows.

The invention according to claim 1 is a random number generation apparatus, comprising:

random noise generation means for generating random noise by measuring physical noise;

random pulse wave generation means for generating a random pulse wave by waveshaping the random noise;

binary pulse sequence conversion means for sampling the random pulse wave at a clock of a constant period and converting it into a binary pulse sequence of a constant period, which includes on/off of the sampled values as a pulse code; and binary pulse sequence code smoothing means for reversing polarity of the binary pulse sequence at intervals of a constant period and smoothing appearance balance of 1/0 code in a specified unit of code length, wherein a random number sequence of the smoothed binary pulse sequence code is generated.

The invention according to claim 2 is the random number generation apparatus according to claim 1, wherein the random pulse wave is generated so that generation interval of the random noise is on/off time of pulse.

The invention according to claim 3 is the random number generation apparatus according to claim 1, wherein random noise composed by using a plurality of the random noise generation means is inputted to the random pulse wave generation means and occurrence frequency of on/off of the random pulse wave is increased.

The invention according to claim 4 is the random number generation apparatus according to claim 1, wherein the random pulse wave generation means is constituted of pulse generation means, the output state of which changes for every input of the random noise as a trigger pulse.

The invention according to claim 5 is the random number generation apparatus according to claim 1, wherein the binary pulse sequence code smoothing means is constituted of a ½ divider, which divides the clock frequency into half, and an XOR gate, which is inputted with output of the ½ divider and the binary pulse sequence.

The invention according to claim 6 is the random number generation apparatus according to claim 1, wherein the binary pulse sequence code smoothing means is constituted of a ½ divider, which divides the clock frequency into half, and a logic circuit, which reverses the binary pulse sequence in synchronization with an output of the ½ divider by turns to output the reversed binary pulse sequence.

DETAILED DESCRIPTION OF THE PREFERRED EMBODIMENTS

Hereinafter, referring to the drawings, embodiments of this invention will be explained.

Figure 1:
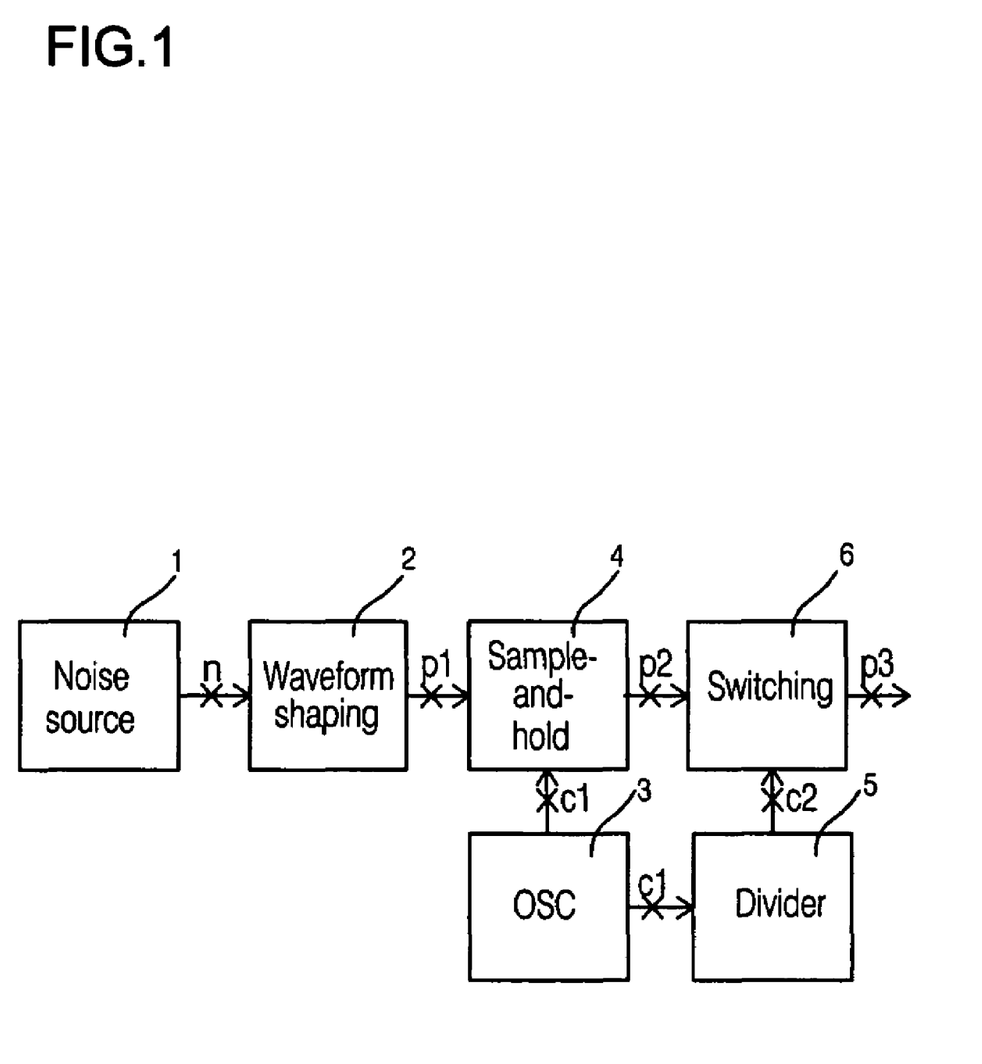
FIG. 1 shows a block diagram of a random number generation apparatus according to an embodiment of this invention.

FIG. 1 shows a block diagram of a random number generation apparatus according to one embodiment of this invention.

In FIG. 1, reference numeral 1 denotes a noise source. The outputs of the noise source 1 are connected to a waveform shaping circuit 2, and the output of the waveform shaping circuit 2 is connected to a sample-and-hold circuit 4. In FIG. 1, reference numeral 3 denotes an oscillator. Outputs of an oscillator 3 are connected to the sample-and-hold circuit 4 and a divider 5 respectively. In addition, the output of the sample-and-hold circuit 4 is connected to a switching circuit 6, and the output of the divider 5 is connected to the switching circuit 6.

Figure 2:
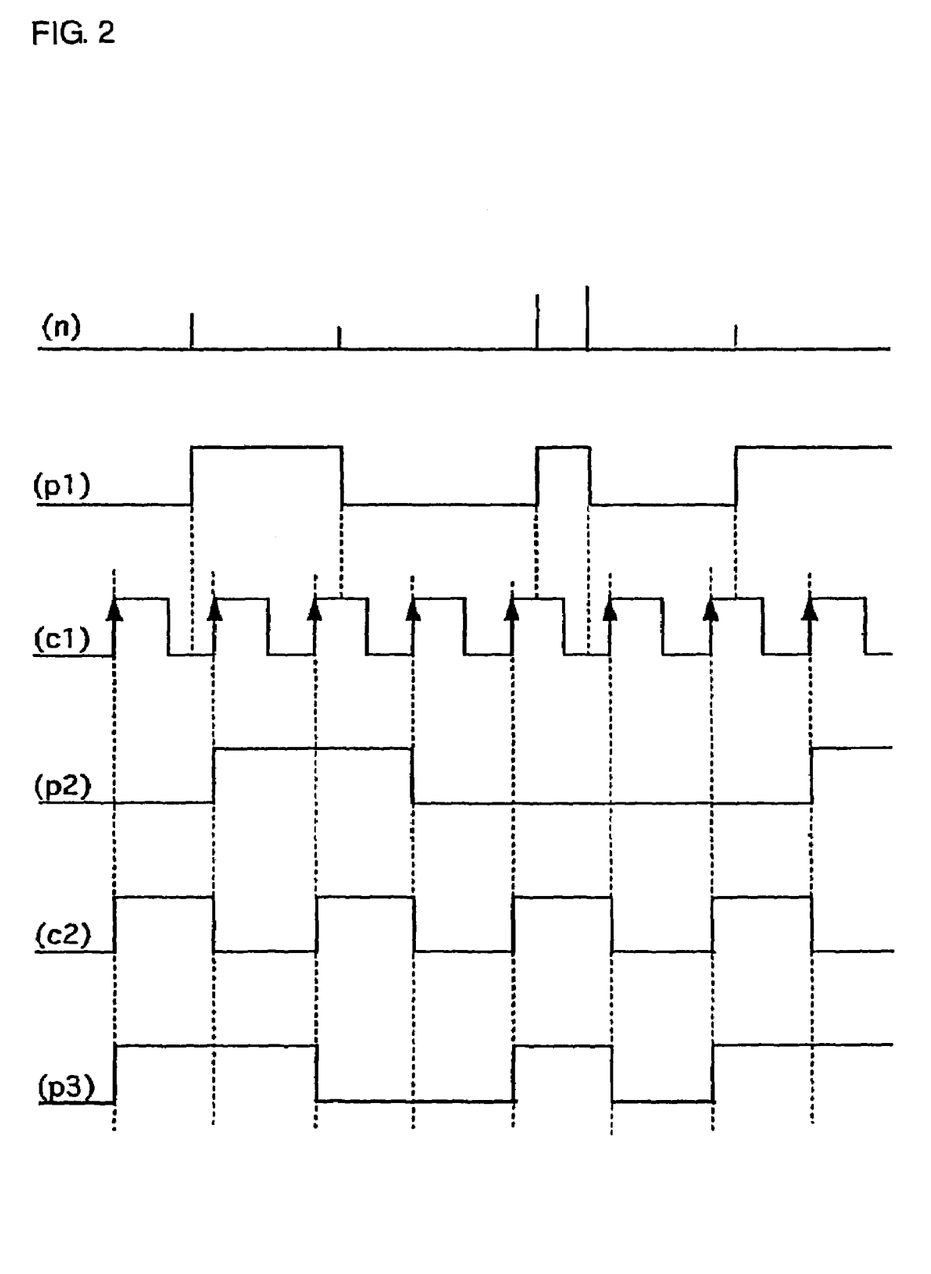
FIG. 2 shows a signal waveform of each block shown in FIG. 1 and its timing chart.

FIG. 2 shows a signal waveform at each point indicated by with a mark "x" in FIG. 1, and its timing chart.

Hereinafter, characteristic operations according to one embodiment of this invention constituted as mentioned above will be explained.

The random number generation apparatus inputs unperiodic random noise n generated by the noise source 1 to the waveform shaping circuit 2 to generate a random pulse wave P1.

Next, the random number generation apparatus inputs the random pulse wave P1 and a clock c1 from the oscillator 3 to the sample-and-hold circuit 4 to generate a constant periodic binary pulse sequence P2.

Subsequently, the binary pulse sequence P2 and a half divided clock c2, which is the clock c1 half divided by the divider 5, are inputted to the switching circuit 6, and the polarity of the binary pulse sequence P2 is reversed at intervals of one period to output a smoothed binary pulse sequence P3 in which appearance balance of 1/0 code is smoothed.

Next, operations will be explained in detail.

The noise source 1 is a physical noise generation source that generates white noise, such as thermal noise, shot noise or electron avalanche.

Figure 3:
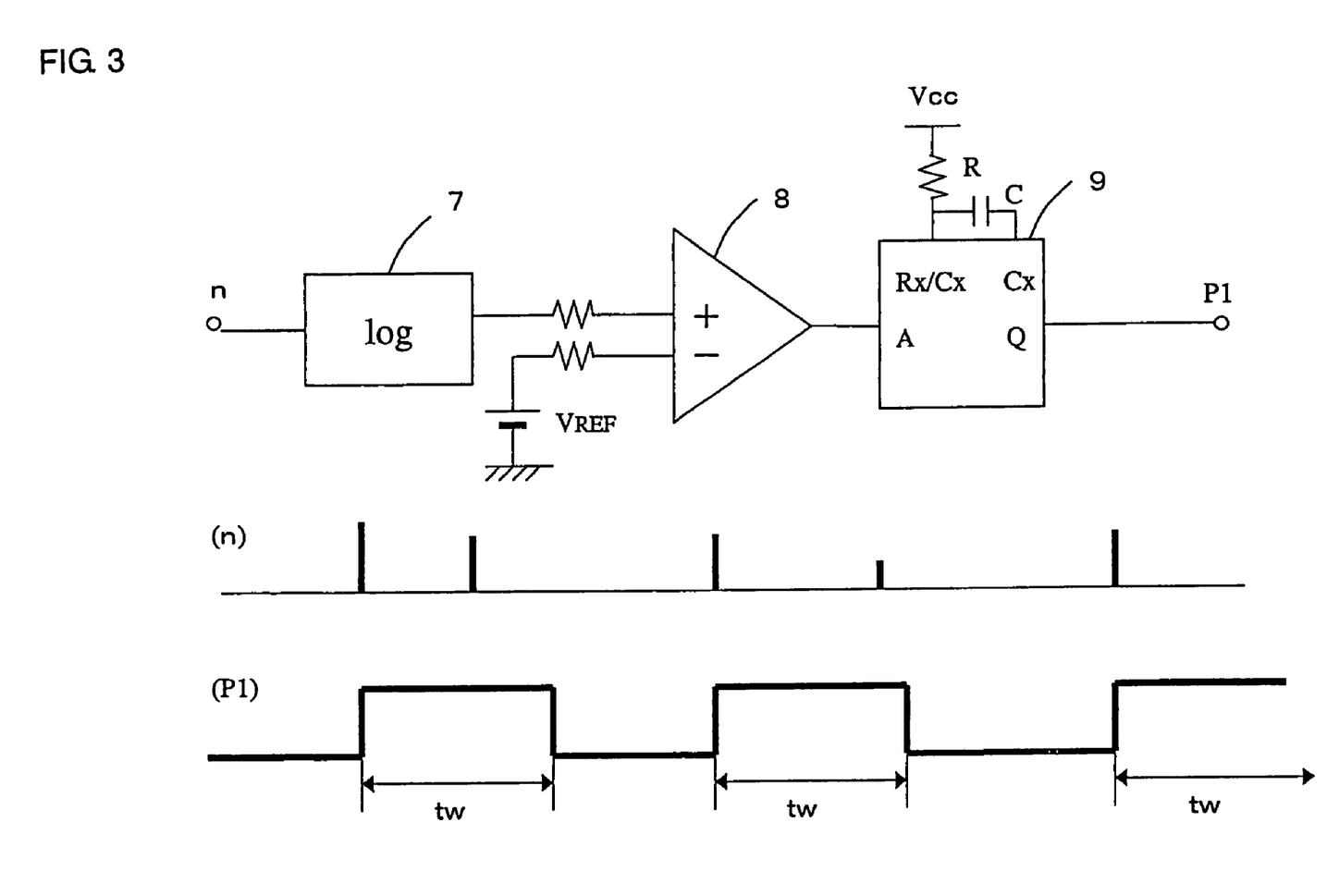
FIG. 3 shows a waveform shaping circuit according to another embodiment of this invention.

As shown in FIG. 3, the waveform shaping circuit 2 may be constituted of a logarithmic amplification circuit 7, a comparator 8 and a mono-stable multivibrator 9.

Random noise n is amplified to a specified voltage level by the logarithmic amplification circuit 7, and inputted to the comparator 8 to output a noise waveform more than a trigger level as a trigger pulse. Subsequently, the trigger pulse is inputted to the mono-stable multivibrator 9 to generate the random pulse wave P1 that has a specified pulse width tw determined by an external time-constant circuit (CR).

The pulse width at this point, is set so as to be more than twice the pulse width of the clock c1 based on the sampling theorem.

In addition, the trigger pulse at this point is an edge part of rising or falling of the random pulse wave P1, and a constant pulse width can be achieved even if the width of the trigger pulse becomes long or short.

Figure 4:
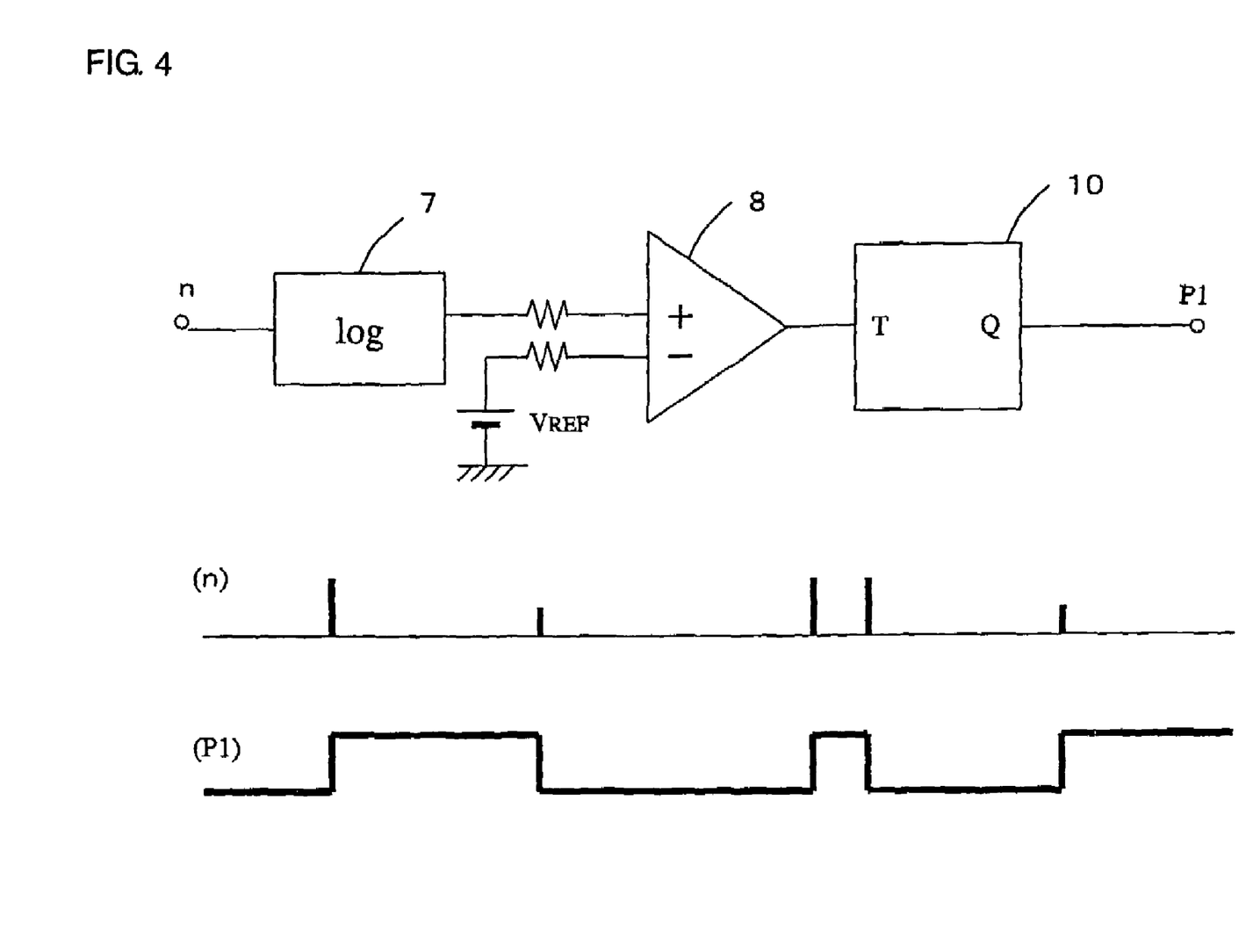
FIG. 4 shows a structure of a waveform shaping circuit according to the embodiment of this invention.

However, if there is a variation of generation interval of the random noise n as shown in this embodiment, and illustrated in FIG. 4, the trigger pulse is inputted to a T type flip-flop T-FF binary counter 10, in which output Q is reversed for every input T, and the random pulse wave Pi, in which occurrence interval of the trigger pulse is on/off time of pulse, is generated.

This results in the ratio of on/off time of the random pulse wave Pi being equalized.

In FIG. 4, codes, which are the same as ones in FIG. 3, show the same objects.

In addition, the operation waves shown in FIG. 4 are the same as the random noise n and the random pulse wave P1 shown in FIG. 2.

If it is desired to speed up random number generation, outputs from a plurality of the same or various types of the noise sources 1 are composed, and then inputted to the sample-and-hold circuit 4 via the waveform shaping circuit 2.

This results in an increase in generation frequency of the random noise n and thus an increase in switching of on/off of the random pulse wave P1.

In this case, period of the clock c1 is shortened according to a generation frequency of the random noise n, and pulse width of the random pulse wave P1 is adjusted to an appropriate length according to the period of the clock c1.

Figure 5:
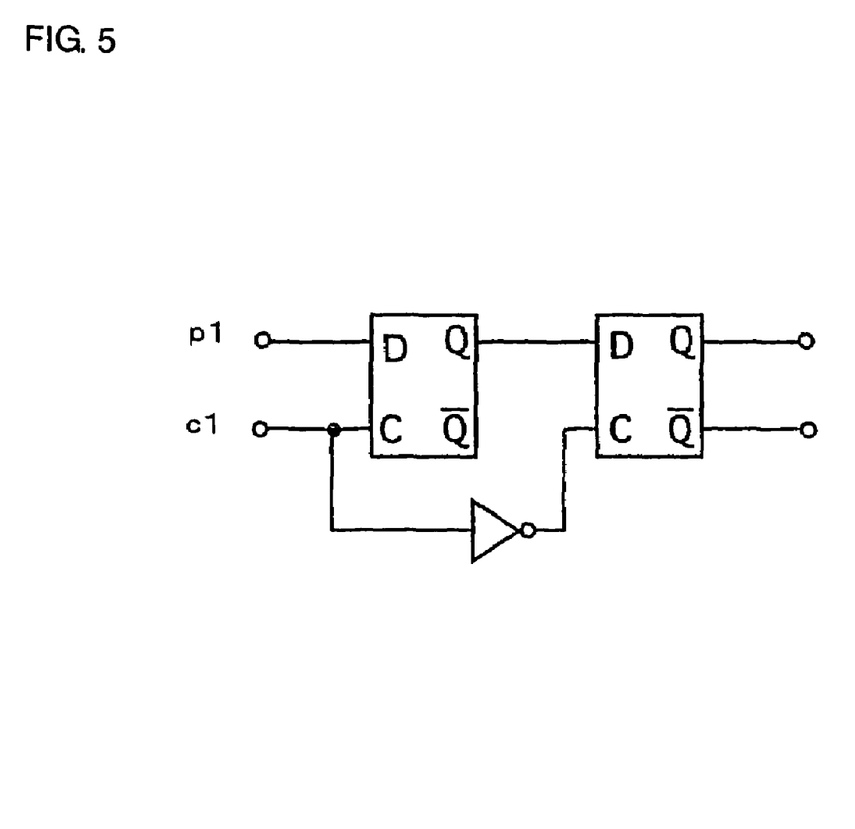
FIG. 5 shows a structure of a sample-and-hold circuit according to the embodiment of this invention.

The sample-and-hold circuit 4, as shown in FIG. 5, is constituted using two flip-flops FF. For input C, the clock c1 is directly supplied to FF in the input side, and the reversed clock c1 is supplied to FF in the output side via an inverter.

Using this method, since the input C of FF in the output side is "0", on/off of the random pulse wave P1 at the input D in FF in the input side, which is stored in the input D of the FF at the rising edge part of the clock c1 at the input C in FF in the input side, is transferred to the output Q of FF in the output side as it is. In the falling edge part of the clock c1 at the input C, the input C of FF in the output side becomes the rising edge part, so that the output Q is maintained and is not changed until next rising edge part of the clock c1 at the input C.

Therefore, in the rising edge part of the clock c1 at the input C, the binary pulse sequence P2 storing on/off state of the random pulse wave P1 is outputted at a half period of the clock c1 synchronizing with the clock c1.

Figure 6:
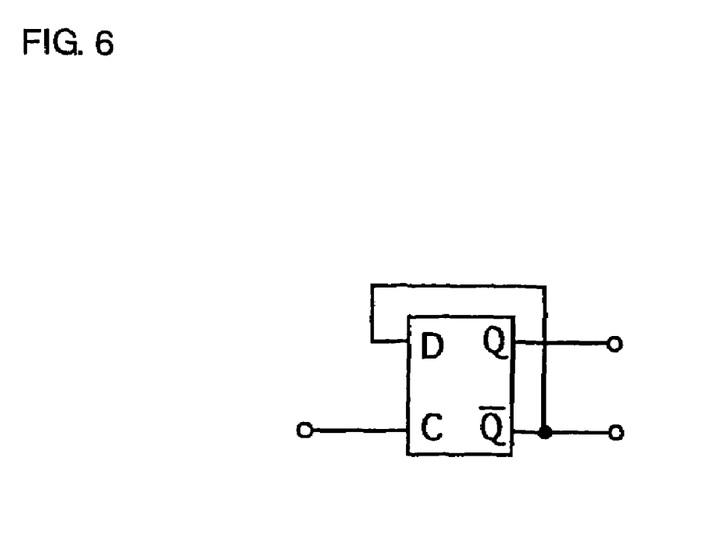
FIG. 6 shows a structure of a divider according to the embodiment of this invention.

Whenever the divider 5 inputs the clock c1 twice to the input T of the T type flip-flop T-FF, the output Q is returned to the original state and the clock c1 is divided in half.

Alternatively, as shown in FIG. 6, the reverse output Q of a D type flip-flop D-FF is connected to the input D, and D-FF may also be operated as T-FF. In this case, the reverse output Q is the next input D, so that the output Q is reversed for every input at the input C.

Figure 7:
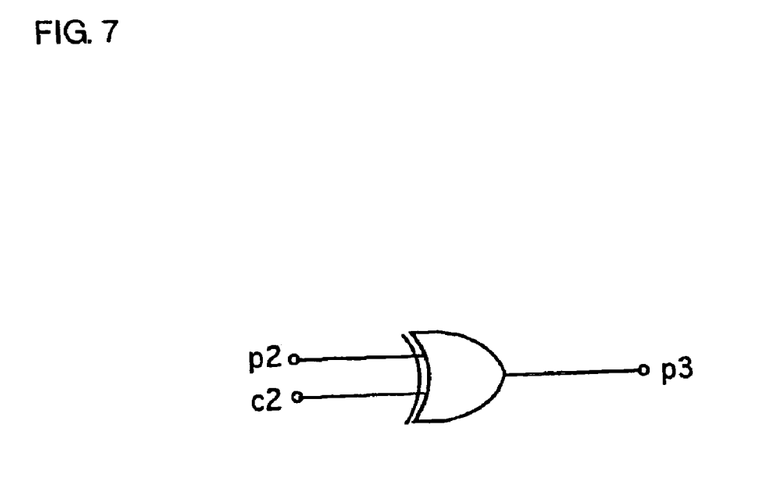
FIG. 7 shows a structure of a switching circuit according to the embodiment of this invention.

As shown in FIG. 7, the switching circuit 6 is constituted using the XOR (exclusive OR) gate. The binary pulse sequence P2 and the half divided clock c2 are inputted to the XOR gate and both of them are exclusive ORed. Synchronizing with 1/0 of the half divided clock c2, the code of the binary pulse sequence P2 is reversed every one period to output the smoothed binary pulse sequence P3. Therefore, the binary pulse P2 is reversed synchronizing with the half divided clock C2, and, the binary pulse sequence P2 signal is outputted from the switching circuit 6 as a signal reversed by turns, such as reversed P2, P2, reversed P2, P2, reversed P2, P2, reversed P2, P2 as shown in the waveform P3 in FIG. 2. Finally, the smoothed binary pulse sequence P3, in which the binary pulse P2 is reversed by turns and smoothed, is outputted from the switching circuit 6.

Figure 8:
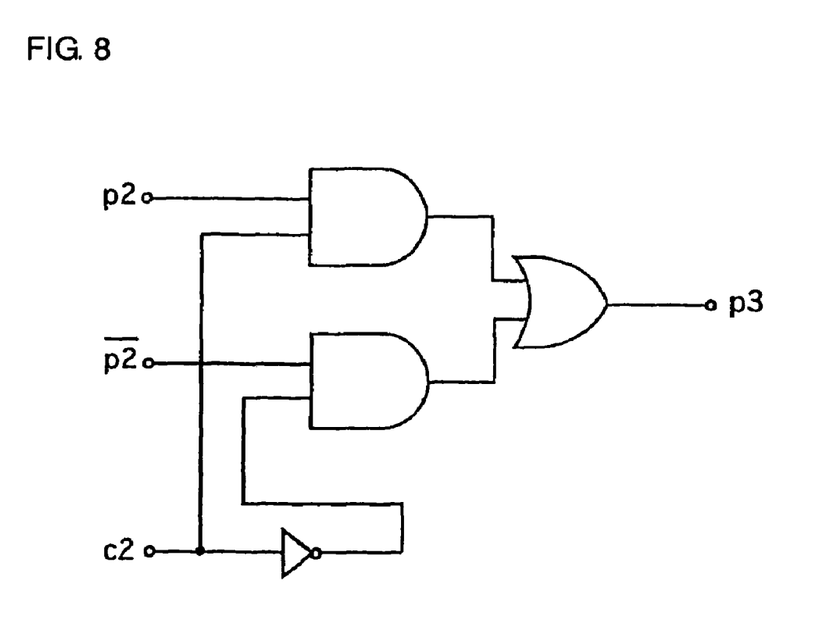
FIG. 8 shows a structure of another switching circuit according to the embodiment of this invention.

Alternatively, as shown in FIG. 8, the switching circuit 6 is constituted using a multiplexer combining with two AND gates and an OR gate and an inverter. Using the half divided clock c2 as control input, either of positive phase output or negative phase output of the binary pulse sequence P2 is selected according to "1" or "0" of the control input, and then the smoothed binary pulse sequence P3 may also be outputted.

Figure 9:
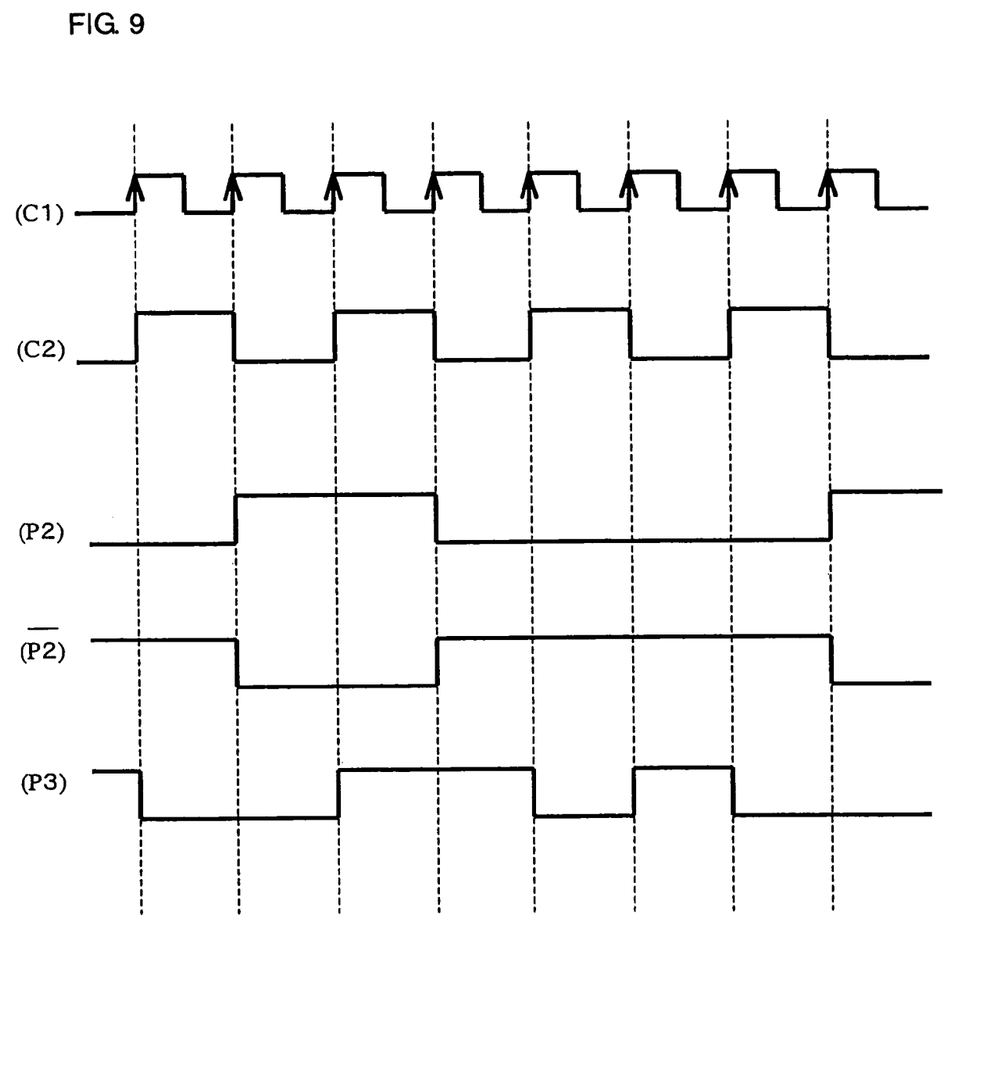
FIG. 9 shows operating waves of the circuit shown in FIG. 8.

The waveform in this case is shown in FIG. 9.

Therefore, in FIG. 9, the positive phase output P2 of the binary pulse sequence P2 is outputted at "1" of the half divided clock c2, and the negative phase output or reversed P2 is outputted at "0" of the half divided clock c2. The binary pulse sequence P2 is reversed by turns as P2, reversed P2, P2, reversed P2, P2, reversed P2 and P2, and smoothed. The smoothed binary pulse sequence P3 is outputted from the switching circuit 6.

In this embodiment, the method of switching a positive phase output and a negative phase output by a half division is adopted. Alternatively, a method of smoothing appearance balance of 1/0 code in a specified unit of code length with an increasing division ratio may also be adopted.

TECHNICAL ADVANTAGE OF THE INVENTION

As described above, the random number generation apparatus according to this invention generates a random pulse wave by waveform shaping random noise, samples it with a clock to convert it into a constant periodic binary pulse sequence. Subsequently, the random number generation apparatus reverses its polarity at intervals of a constant period to generate a random number sequence of binary pulse sequence code.

Therefore, according to this invention, appearance balance of 1/0 in a binary pulse sequence generally depends on generation frequency of noise, so that it becomes imbalanced. However, as described above, by reversing the polarity of a binary pulse sequence at intervals of a constant period, imbalance of code arrangement is smoothed and a binary pulse sequence, the appearance probability of 1/0 of which is certainly close to ½ respectively, can be achieved.

For example, in a binary pulse sequence "01100011001110000100", the appearance probability of 1/0 is 8/20 and 12/20 respectively, and thus inclines toward "0". If the polarity is reversed at intervals of one period, the binary pulse sequence becomes "00110110011011010001". The appearance probability of 1/0 is 10/20 and 10/20 respectively, and thus becomes close to, or is ½.

In addition, the random number generation apparatus according to this invention generates a random pulse wave in which generation interval of random noise is on/off time of the pulse.

Generally, the ratio of on/off time of a random pulse wave depends on generation frequency of noise, so that it inclines toward either. However, according to this invention, since a generation interval of random noise is on/off time of a pulse, the ratio becomes equal.

In addition, the random number generation apparatus according to this invention inputs random noise, which is composed using a plurality of random noise generation means, to random pulse wave generation means to increase occurrence frequency of on/off of random pulse waves.

Therefore, according to this invention, the frequency of a binary pulse sequence, which is generated by sampling a random pulse wave, is made high in accordance with an occurrence frequency of on/off of the random pulse wave, so that random number generation can be further speeded up.

In addition, in the random number generation apparatus according to this invention, the random pulse wave generation means is constituted of means for converting the random noise into a trigger pulse and pulse occurrence means, the output state of which changes for every input of the converted trigger pulse. Preferably, the random pulse wave generation means is constituted of a logarithmic amplifier, a comparator, and a toggle flip-flop (a flip-flop that reverses output state at the rising edge or the falling edge of an input pulse) or a mono-stable multi vibrator (one-shot multi-vibrator).

In addition, binary pulse sequence code smoothing means is constituted of a ½ divider to divide clock frequency into half and a multiplexer or an XOR gate.

Therefore, according to this invention, an apparatus can be constituted mainly using a digital circuit, so that analog circuit parts, which handle feeble signals, are reduced and are unlikely to be influenced by disturbance, so that reliability of the apparatus is improved.

Furthermore, the circuit is simplified and it is almost unnecessary to perform analog adjustment, so that manufacturing costs are decreased and mass production becomes easy.

The invention claimed is:

1. A random number generation apparatus which produces a random number sequence for which an appearance balance of 1/0 has an equal probability, comprising:

a random noise generator arranged to receive physical noise at an input and to generate random noise in response;

at least one random pulse wave generator arranged to receive said random noise at an input, waveshape said random noise, and to generate a random pulse wave in response;

a binary pulse sequence converter arranged to receive said random pulse wave at an input, to sample the random pulse wave with a first clock of a constant period and to convert it into a binary pulse sequence of a constant period, which has on/off of the sampled values as a pulse code; and a binary pulse sequence code smoothing circuit arranged to receive said binary pulse sequence at an input, to un-reverse and reverse the polarity of the binary pulse sequence every half period of a second clock which is synchronous with and has a frequency which is related to that of said first clock by a division ratio, and to provide the un-reversed and reversed binary pulse sequence at an output, said output being a random number sequence, said un-reversing and reversing polarity ensuring that said random number sequence has an appearance balance of 1/0 with an equal probability.

2. The random number generation apparatus according to claim 1, wherein the random pulse wave is generated so that the generation interval of the random noise defines the on/off time of each pulse.

3. The random number generation apparatus according to claim 1, wherein the outputs of a plurality of said random noise generators are inputted to the random pulse wave generator such that the on/off occurrence frequency of the random pulse wave is increased.

4. The random number generation apparatus according to claim 1, wherein the at least one random pulse wave generator comprises pulse generation means which receives said random noise at an input, said pulse generation means arranged such that its output state changes for every occurrence of random noise received at said input.

5. The random number generation apparatus according to claim 1, wherein the binary pulse sequence code smoothing circuit comprises a divider which divides the frequency of said first clock by half to generate said second clock, and an XOR gate which receives said binary pulse sequence and said second clock at respective inputs and provides said smoothed binary pulse sequence at its output.

6. The random number generation apparatus according to claim 1, wherein the binary pulse sequence code smoothing circuit comprises a divider which divides the frequency of said first clock by half to generate said second clock, and a logic circuit which reverses the binary pulse sequence synchronously with said second clock to un-reverse and reverse the polarity of the binary pulse sequence every half period of said second clock.

7. The random number generation apparatus according to claim 1, wherein the frequency of said second clock is one-half that of said first clock.

* * * * *